United States Patent
Shih et al.

(10) Patent No.: US 7,987,115 B2
(45) Date of Patent: Jul. 26, 2011

(54) ADVERTISEMENT SELECTION SYSTEMS AND METHODS FOR INTERNET ARTICLES

(75) Inventors: Chia-Chun Shih, Taipei County (TW); Tse-Ming Tsai, Taoyuan (TW)

(73) Assignee: Institute for Information Industry, Taipei (TW)

( * ) Notice: Subject to any disclaimer, the term of this patent is extended or adjusted under 35 U.S.C. 154(b) by 879 days.

(21) Appl. No.: 12/005,354

(22) Filed: Dec. 27, 2007

(65) Prior Publication Data

US 2009/0138351 A1 May 28, 2009

(30) Foreign Application Priority Data

Nov. 27, 2007 (TW) .............................. 96144937 A

(51) Int. Cl.
*G06Q 30/00* (2006.01)
(52) U.S. Cl. .................... 705/14.73; 705/14.72
(58) Field of Classification Search ...... 705/14.1–14.73; 725/37–53; 707/705–788
See application file for complete search history.

(56) References Cited

U.S. PATENT DOCUMENTS

| | | | | |
|---|---|---|---|---|
| 5,884,305 | A * | 3/1999 | Kleinberg et al. ............. | 1/1 |
| 6,112,202 | A * | 8/2000 | Kleinberg ..................... | 1/1 |
| 6,560,600 | B1 * | 5/2003 | Broder ......................... | 1/1 |
| 6,996,572 | B1 * | 2/2006 | Chakrabarti et al. ......... | 715/205 |
| 7,080,073 | B1 * | 7/2006 | Jiang et al. .................. | 1/1 |
| 7,319,976 | B1 * | 1/2008 | Peckover .................... | 705/14.36 |
| 7,716,225 | B1 * | 5/2010 | Dean et al. .................. | 707/748 |
| 7,801,843 | B2 * | 9/2010 | Kumar et al. ................ | 706/61 |
| 2001/0014868 | A1 * | 8/2001 | Herz et al. .................. | 705/14 |
| 2003/0014399 | A1 * | 1/2003 | Hansen et al. .............. | 707/3 |
| 2004/0267806 | A1 * | 12/2004 | Lester ........................ | 707/103 R |
| 2006/0015571 | A1 * | 1/2006 | Fukuda et al. .............. | 709/217 |
| 2006/0265400 | A1 * | 11/2006 | Fain et al. .................. | 707/10 |
| 2007/0027864 | A1 * | 2/2007 | Collins et al. .............. | 707/5 |
| 2007/0073641 | A1 * | 3/2007 | Perry et al. ................ | 707/2 |
| 2007/0198506 | A1 * | 8/2007 | Attaran Rezaei et al. ... | 707/5 |
| 2007/0250468 | A1 * | 10/2007 | Pieper ........................ | 707/1 |
| 2007/0276726 | A1 * | 11/2007 | DiMatteo .................... | 705/14 |

OTHER PUBLICATIONS

Kleinberg, J. M., "Authoritative sources in a Hyperlinked Environment", J. ACM 46, 604-632 (1999). <http://web.archive.org/web/20060907150530/www.cs.cornell.edu/home/kleinber/auth.pdf>.*
Ding et al. "Link Analysis: Hubs and Authorities on the World Wide Web", LBNL Tech Report 47847. May 7, 2001 (updated Jul. 2003). <http://citeseerx.ist.psu.edu/viewdoc/download?doi=10.1.1.79.3461&rep=rep1&type=pdf>.*
"Hubs and authorities", all pages. Retrieved Sep. 23, 2010. <http://en.wikipedia.org/wiki/Hubs_and_authorities>.*
"HITS algorithm", all pages. Retrieved Sep. 23, 2010. <http://en.wikipedia.org/wiki/HITS_algorithm>.*

(Continued)

*Primary Examiner* — Mary Cheung
(74) *Attorney, Agent, or Firm* — Thomas/Kayden

(57) ABSTRACT

Advertisement selection systems and methods for internet articles are provided. A personal advertisement agent generates an article characteristic value according to an internet article edited by a content editor. An advertisement server selects at least one of the advertisements according to the article characteristic value, a specialty characteristic value, and advertisement characteristic values of respective advertisements, wherein the specialty characteristic value is generated according to historical articles published by the client. The selected advertisement is integrated and published with the internet article.

19 Claims, 8 Drawing Sheets

OTHER PUBLICATIONS

Li et al. "Improvement of HITS-based Algorithms on Web Documents", (2002). <http://www2002.org/CDROM/refereed/643/>.*

Wang et al. "An Ontology-Based Binary-Categorization Approach for Recognizing Multiple-Record Web Documents Using a Probabilistic Retrieval Model", Information Retrieval vol. 6, Nos. 3-4, 295-332. (2003). <http://www.springerlink.com/content/m6377q2h42451120/fulltext.pdf>.*

"PageRank", All pages. Retrieved on Sep. 23, 2010. <http://en.wikipedia.org/wiki/PageRank>.*

* cited by examiner

ADVERTISEMENT SELECTION SYSTEMS AND METHODS FOR INTERNET ARTICLES

BACKGROUND OF THE INVENTION

1. Field of the Invention

The disclosure relates generally to advertisement selection systems and methods for internet articles, and, more particularly to advertisement selection systems and methods for internet articles that simultaneously consider the article content, the advertisement content, and the publisher's specialty.

2. Description of the Related Art

Recently, applications developed for users allow browsing and posting of comments via BBSs (Bulletin Board Systems) on the network. Users can publish articles via a specific web site or a dedicated web page. Currently, blog (web log) applications are popular, whereon user-owners can publish material, in addition to referencing material on other users' blogs.

Driven by the popularity of blogs, advertisers currently advertise their products or web sites via the blogs and articles published thereon. In conventional art, users insert a section of program codes to an internet article (or web page). The program codes actively link to a specific server to download specific advertisements. With this method, users have no discrepancy to choose advertisements, and the suitability between articles and advertisements are not considered. In another conventional art, users directly select and download a specific advertisement from an advertiser via the network, and embed the specific advertisement in the internet article. With this method, the user is inconvenienced with manually performing the selection and embedding of advertisements. In yet another conventional art, advertisements are retrieved according to keyword matching between the contents of internet articles and advertisements. With this method, simple keyword matching has limitations in practice. For example, respective users may have different keyword usage habits or customs, thereby reducing the matching accuracy between advertisements and internet articles. Additionally, methods that do not consider a publisher's specialty, will decrease advertising benefits if advertisements are only determined based on the content of a single article.

BRIEF SUMMARY OF THE INVENTION

Advertisement selection systems and methods for internet articles are provided.

An embodiment of an advertisement selection system for internet articles comprises a client, a specialty degree calculation unit, and an advertisement server. The client comprises a content editor and a personal advertisement agent. The content editor edits at least one internet article. The personal advertisement agent generates an article characteristic value corresponding to at least one article characteristic according to the internet article. The specialty degree calculation unit has a specialty characteristic value corresponding to at least one specialty characteristic, wherein the specialty characteristic value is generated according to historical articles published by the client. The advertisement server has a plurality of advertisements, each comprising an advertisement characteristic value corresponding to at least one advertisement characteristic. The advertisement server selects one of the advertisements according to the article characteristic value, the specialty characteristic value, and advertisement characteristic values of respective advertisements. The selected advertisement is integrated and published with the internet article.

In an embodiment of an advertisement selection method for internet articles, an internet article is edited by a client. An article characteristic value corresponding to at least one article characteristic is generated according to the internet article. At least one of a plurality of advertisements is selected according to the article characteristic value, a specialty characteristic value, and advertisement characteristic values of respective advertisements, wherein the specialty characteristic value is generated according to historical articles published by the client. The selected advertisement is integrated and published with the internet article.

Advertisement selection systems and methods for internet articles may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Advertisement selection systems and methods for internet articles are provided.

Figure 1:
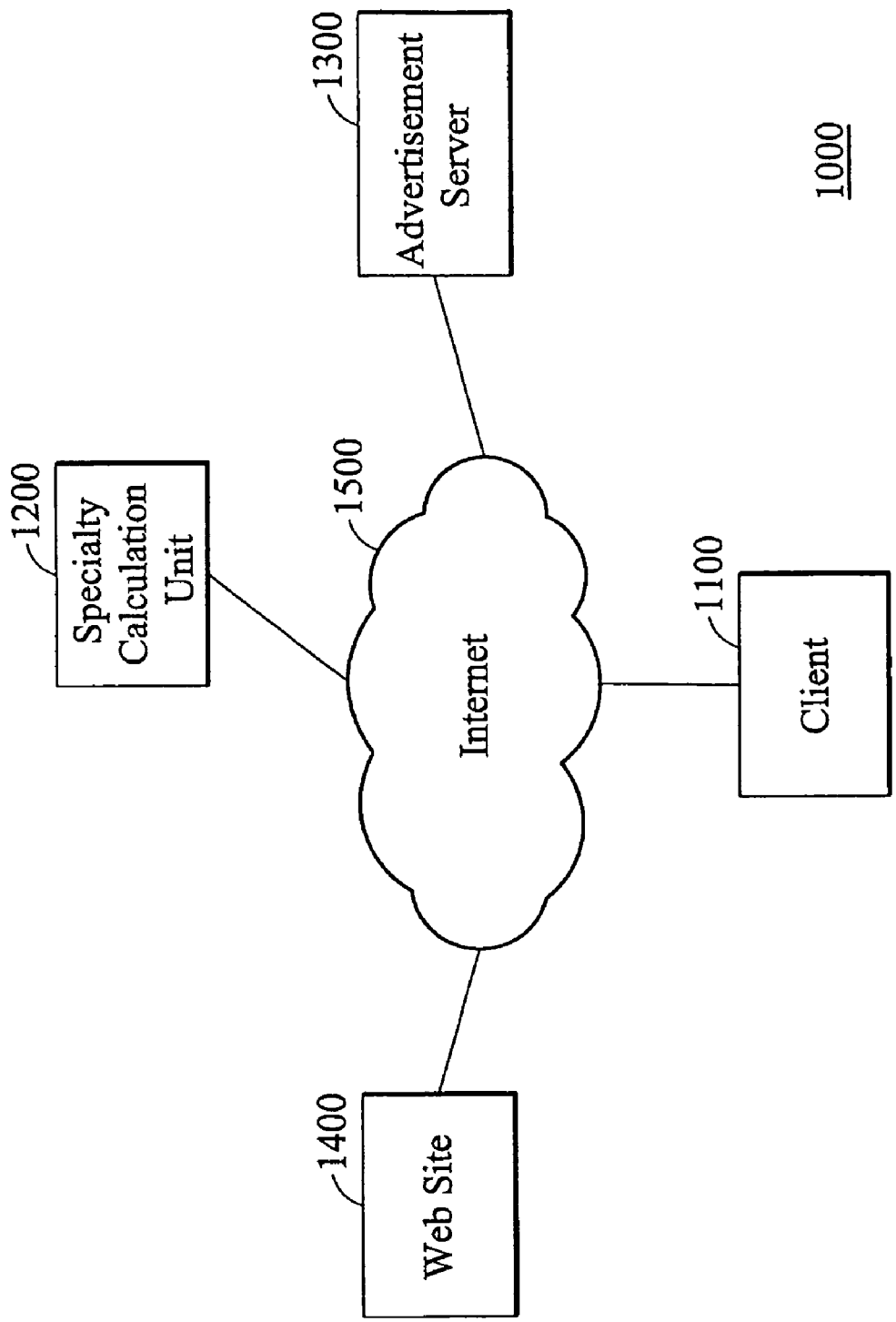
FIG. 1 is a schematic diagram illustrating an embodiment of an advertisement selection system for internet articles according to the invention.

FIG. 1 is a schematic diagram illustrating an embodiment of an advertisement selection system for internet articles according to the invention.

As shown in FIG. 1, the advertisement selection system 1000 for internet articles comprises a client 1100, a specialty calculation unit 1200, an advertisement server 1300 and at least one web site 1400 for publishing articles. The client 1100, the specialty calculation unit 1200, the advertisement server 1300, and the web site 1400 can couple with each other via an Internet 1500.

Figure 2:
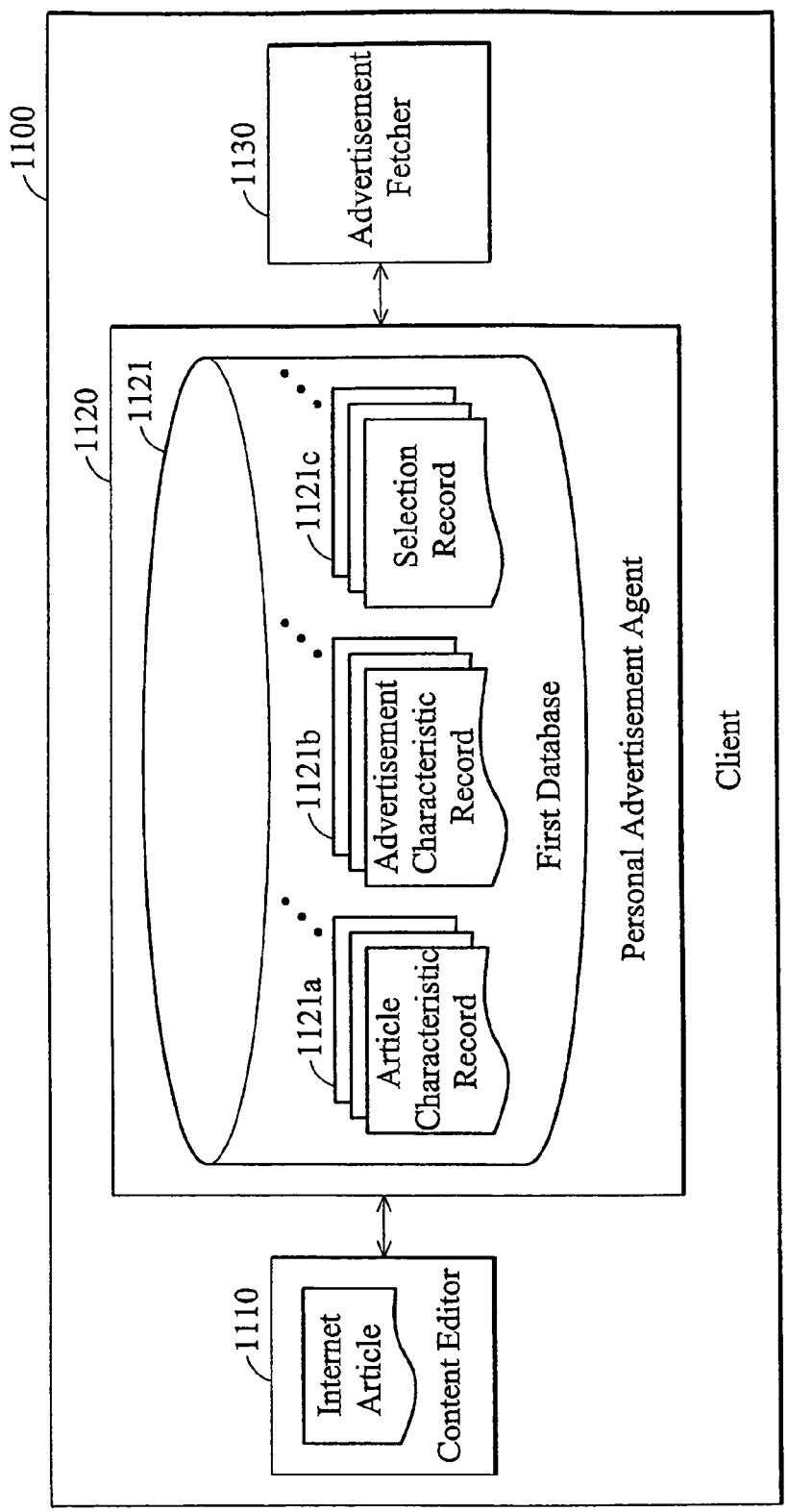
FIG. 2 is a schematic diagram illustrating an embodiment of a client according to the invention.

FIG. 2 is a schematic diagram illustrating an embodiment of a client according to the invention. The client 1100 comprises a content editor 1110, a personal advertisement agent 1120, and an advertisement fetcher 1130. The content editor 1110 can be used to edit internet articles 1111. The personal-advertisement agent 1120 comprises a first database 1121.

The first database 1121 comprises article characteristic records 1121a, advertisement characteristic records 1121b, and selection records 1121c. The article characteristic record 1121a records an article identification code, a storage time (edition time), and/or at least one article characteristic and an article characteristic value corresponding to a respective internet article. In some embodiments, the article characteristic may be the keyword of the internet article, and the article characteristic value may be the representation strength, such as use frequency of the keyword in the article. The advertisement characteristic record 1121b records an advertisement identification code, advertisement content, an expiration date/time, and/or a selection date/time corresponding to the advertisement selected on the client 1100. The selection record 1121c records the advertisement identification code of a selected advertisement, the article identification code of an article integrated with the selected advertisement, and/or a selection date/time. When the content editor 1110 edits an internet article 1111, the personal advertisement agent 1120 generates an article characteristic value corresponding to at least one article characteristic according to the content of the edited internet article 1111. After the article characteristic value of the internet article is generated, the personal advertisement agent 1120 generates the article characteristic record 1121a. It is understood that when the article characteristic value of the internet article is generated, the personal advertisement agent 1120 can transmit the article characteristic value to the advertisement server 1300 via the advertisement fetcher 1130. When the client 1100 receives candidate advertisements, and selects at least one of the candidate advertisements via the content editor 1110, the personal advertisement agent 1120 generates the advertisement characteristic record 1121b, and the selection record 1121c. It is understood that the personal advertisement agent 1120 can further transmit the selection records 1121c to the advertisement server 1300. Additionally, the personal advertisement agent 1120 can check whether any updated events for advertisements have been triggered. If so, the article characteristic value for the internet article is re-generated according to the article content, and the article characteristic value is transmitted to the advertisement server 1300 via the advertisement fetcher 1130. The advertisement fetcher 1130 obtains candidate advertisements from the advertisement server 1300 via the Internet 1500, and transmits the candidate advertisements to the content editor 1110. Users can select at least one of the candidate advertisements using the content editor 1110, and embed the selected advertisement to the internet article 1111.

The specialty calculation unit 1200 comprises a specialty characteristic value corresponding to at least one specialty characteristic for the client 1100. The specialty characteristic value of the client 1100 can be generated according to historical articles published by the client 1100. The historical articles can be fetched by a data collection unit (not shown) from the Internet, or obtained via a data access interface provided by the blog service provider. It is noted that the article content may comprise keywords, and the article content may comprise interaction behaviors, such as comments, trackbacks, links, subscriptions, recommendations, and blogrolls. The specialty calculation unit 1200 can calculate a concern score regarding respective concepts for a specific user according to use frequency of respective key terms (keywords) corresponding to the specific user, use frequency of respective key terms corresponding to all users, and a term-concept relation matrix. The term-concept relation matrix defines the association degrees between the respective key terms and the concepts in an Ontology. Then, a relation matrix corresponding to at least one specific concept is calculated according to users corresponding to respective interaction behaviors, a type weighting corresponding to respective interaction behaviors, and the association degrees for the key terms and concepts used in respective interaction behaviors. Thereafter, at least one interaction score for the specific user regarding the specific concept is calculated according to the relation matrix using an algorithm such as HITS (Hypertext-Induced Topic Search) algorithm. The interaction score comprises a hub score and an authority score. In HITS algorithm, a graph relation matrix is input, and a hub value and an authority value are provided to respective nodes after processing, where the hub value represents the strength of outward connection for the node, and the authority value represents the strength of reception connection for the node. HITS algorithm is well known, and further description is omitted due to brevity. The interaction score for the specific user regarding the specific concept can be calculated according to the relation matrix corresponding to the specific concept using the HITS algorithm. Finally, the specialty characteristic value of the client can be calculated according to the concern score, the hub score, and/or the authority score.

Figure 3:
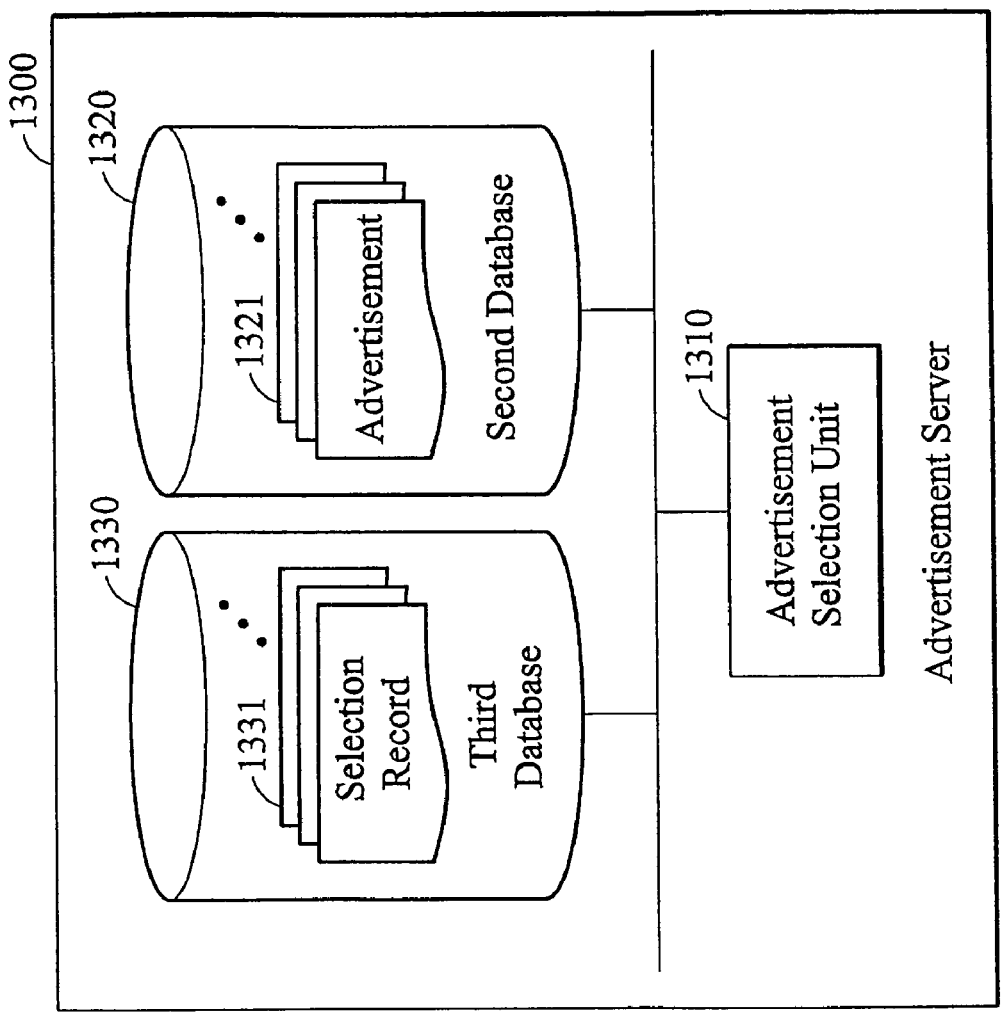
FIG. 3 is a schematic diagram illustrating an embodiment of an advertisement server according to the invention.

FIG. 3 is a schematic diagram illustrating an embodiment of an advertisement server according to the invention. The advertisement server 1300 comprises an advertisement selection unit 1310, a second database 1320, and a third database 1330. The second database 1320 comprises a plurality of advertisements 1321. Each advertisement has an advertisement identification code, advertisement content, and an advertisement characteristic value corresponding to at least one advertisement characteristic, and/or an expiration date/time. It is understood that the advertisement characteristic may comprise a carrier characteristic and a content characteristic. In some embodiments, the carrier characteristic defines the category of internet articles suitable for the advertisement, wherein the category discloses the basic semantic attribute of articles. The content characteristic may be the keywords corresponding to the advertisement. The third database 1330 comprises selection records 1331. The selection records 1331 are received from the client 1200. An advertisement selection record can be generated by analyzing the selection records 1331, wherein the advertisement selection record comprises the selected historical advertisements corresponding to the client, the article characteristic value of the internet article integrated with the respective selected historical advertisements, and the selection times for the respective selected historical advertisements. The advertisement selection unit 1310 selects at least one of the advertisements as the candidate advertisement according to the article characteristic value of the internet article, the specialty characteristic value of the client 1200, the advertisement characteristic values of respective advertisements, and/or advertisement selection records. The advertisement selection unit 1310 then transmits the candidate advertisements to the advertisement fetcher 1130 via the Internet 1500. Similarly, after the candidate advertisements are received, the advertisement fetcher 1130 transmits the candidate advertisements to the content editor 1110. Users can select at least one of the candidate advertisements via the content editor 1110, and embed the selected advertisement in the internet article 1111. After the advertisement is embedded in the internet article 1111, the internet article 1111 is published to the published web site 1400, such as a web site or blog via the Internet 1500.

Figure 4:
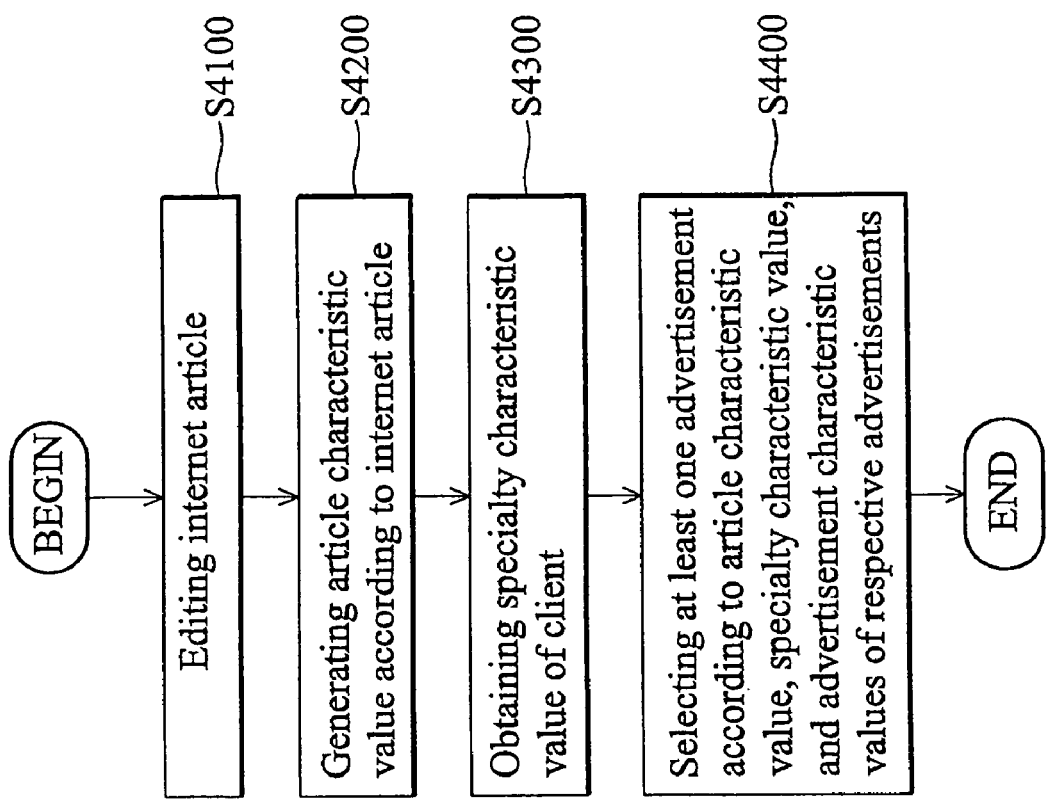
FIG. 4 is a flowchart of an embodiment of an advertisement selection method for internet articles according to the invention.

FIG. 4 is a flowchart of an embodiment of an advertisement selection method for internet articles according to the invention. In this embodiment, advertisements are selected according to the article characteristic value of the internet article, the specialty characteristic value of the client, and the advertisement characteristic values of respective advertisements.

In step S4100, an internet article is edited using the content editor. In step S4200, an article characteristic value ACV corresponding to at least one article characteristic is generated according to the content of the internet article. In some embodiments, the article characteristic may be the keyword of the internet article, and the article characteristic value may be the representation strength of the keyword in the internet article. Additionally, when the article characteristic value ACV is generated, an article characteristic record is generated. In step S4300, a specialty characteristic value SCV corresponding to at least one specialty characteristic of the client is obtained from the specialty calculation unit. It is understood that the specialty characteristic value of the client is generated according to historical articles published by the client. Finally, in step S4400, at least one of a plurality of advertisements is selected as a candidate advertisement according to the article characteristic value, a specialty characteristic value, and advertisement characteristic values of respective advertisements. It is noted that the candidate advertisements are transmitted to the content editor. The client can select at least one of the candidate advertisements to integrate with the internet article, and publish the internet article to the web site or blog. It is understood that when at least one of the candidate advertisements is selected, an advertisement characteristic record and a selection record are generated.

Figure 5:
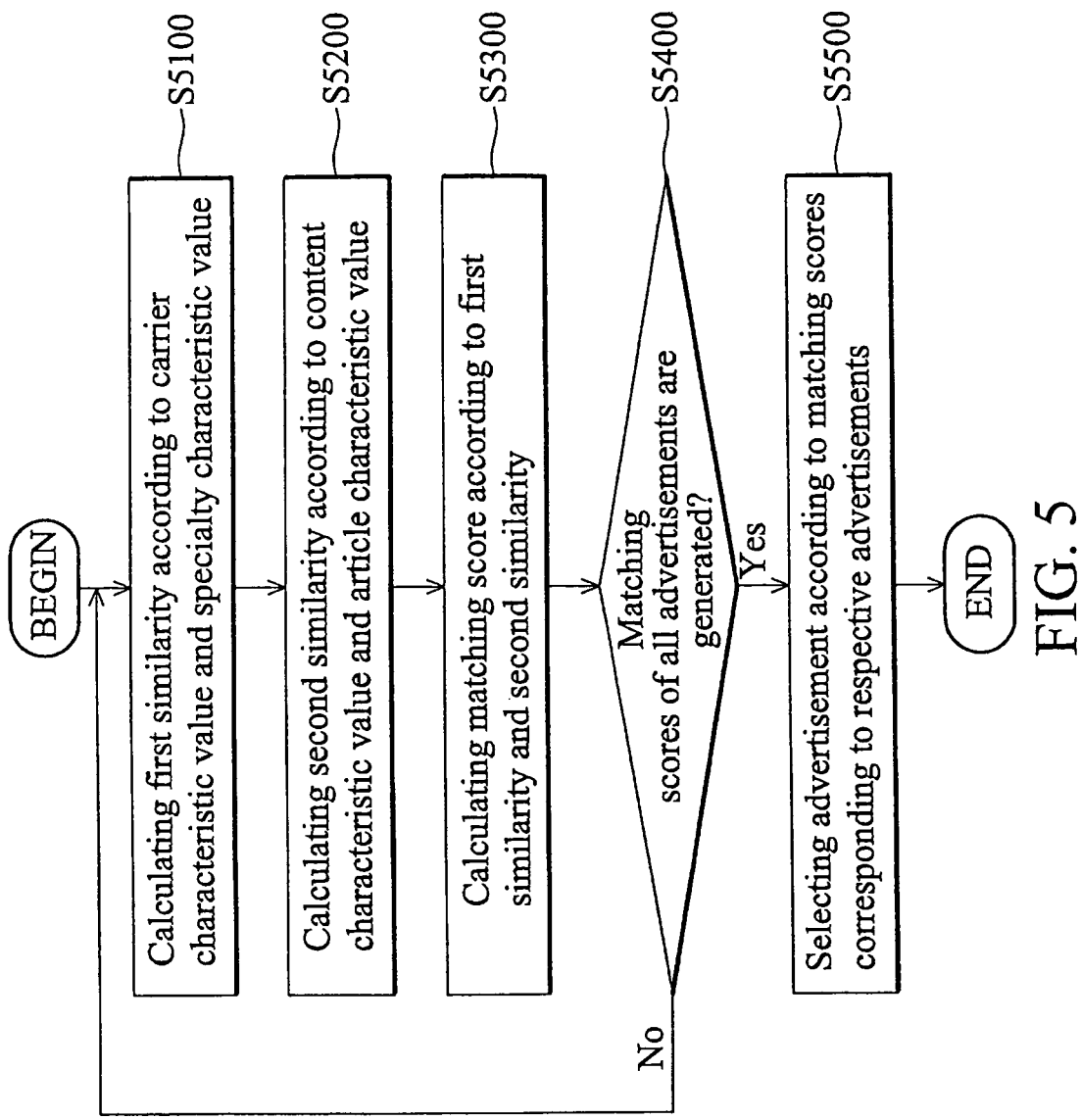
FIG. 5 is a flowchart of an embodiment of an advertisement selection method according to an article characteristic value, a specialty characteristic value, and advertisement characteristic values according to the invention.

FIG. 5 is a flowchart of an embodiment of an advertisement selection method according to an article characteristic value, a specialty characteristic value, and advertisement characteristic values according to the invention.

For each advertisement, in step S5100, a first similarity FS is calculated according to a carrier characteristic value LCV corresponding to at least one carrier characteristic of the advertisement and the specialty characteristic value SCV of the client. In some embodiments, the similarity can be calculated according to Cosine Similarity. For example, the carrier characteristic and the specialty characteristic comprise (comic, cartoons), the carrier characteristic values LCV corresponding to (comic, cartoons) of an advertisement are (3, 3), and the specialty characteristic values SCV corresponding to (comic, cartoons) of a client are (5.2, 4.7). The first similarity FS is calculated according to the carrier characteristic values LCV (3, 3) and the specialty characteristic values SCV (5.2, 4.7) using Cosine Similarity. In step S5200, a second similarity SS is calculated according to a content characteristic value CCV corresponding to at least one content characteristic of the advertisement and an article characteristic value ACV of the internet article. For example, the content characteristic and the article characteristic comprise (chien-ming wang, baseball), the content characteristic values CCV corresponding to (chien-ming wang, baseball) of an advertisement are (5, 4), and the article characteristic values ACV corresponding to (chien-ming wang, baseball) of the internet article are (8.1, 4.2). The second similarity SS is calculated according to the content characteristic values CCV (5, 4) and the article characteristic values ACV (8.1, 4.2) using Cosine Similarity. In step S5300, a matching score MS is calculated according to the first similarity FS and the second similarity SS. In some embodiments, the matching score MS can be calculated according to the following equation: MS=FS×W1+SS×W2, wherein W1 is the weighting corresponding to the first similarity FS, and W2 is the weighting corresponding to the second similarity SS. W1 and W2 can be adjusted according to different requirements. In step S5400, it is determined whether the matching scores for respective advertisements are generated. If not (No in step S5400), steps S5100~S5300 are repeated, the matching score for another advertisement is calculated. If so (Yes in step S5400), in step S5500, candidate advertisements are determined according to the matching scores of the respective advertisements. It is understood that, in some embodiments, if the matching score of an advertisement is greater than a predefined score, the advertisement is determined as a candidate advertisement. In some embodiments, the advertisements are sorted according to the corresponding matching scores, and a predetermined number of the advertisements having higher matching scores are determined as candidate advertisements. Similarity, the candidate advertisements are transmitted to the content editor. The client can select at least one of the candidate advertisements to integrate with the internet article, and publish the internet article to the web site or blog.

Figure 6:
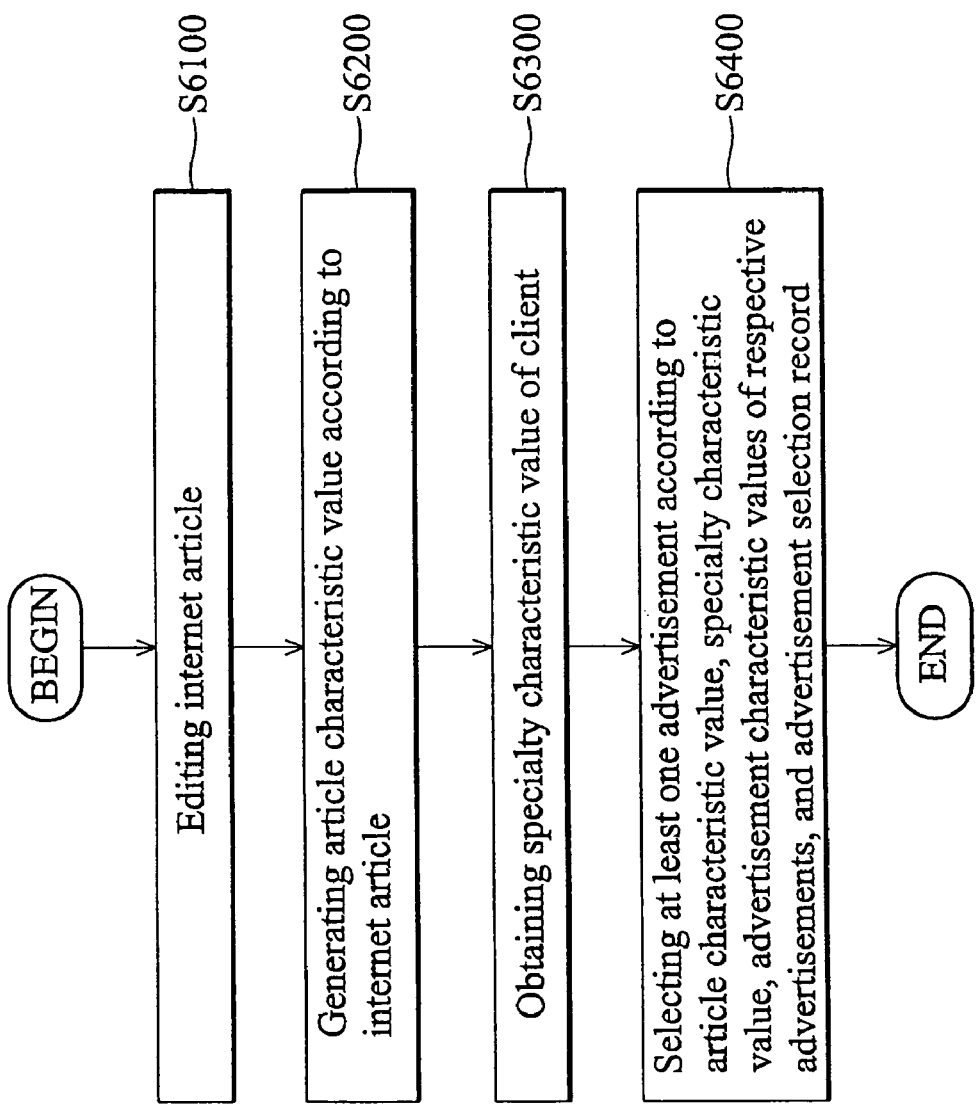
FIG. 6 is a flowchart of an embodiment of an advertisement selection method for internet articles according to the invention.

FIG. 6 is a flowchart of an embodiment of an advertisement selection method for internet articles according to the invention. In this embodiment, advertisements are selected according to the article characteristic value of the internet article, the specialty characteristic value of the client, the advertisement characteristic values of respective advertisements, and the advertisement selection record.

In step S6100, an internet article is edited using the content editor. In step S6200, an article characteristic value ACV corresponding to at least one article characteristic is generated according to the content of the internet article. In some embodiments, the article characteristic may be the keyword of the internet article, and the article characteristic value may be the representation strength of the keyword in the internet article. Additionally, when the article characteristic value ACV is generated, an article characteristic record is generated. In step S6300, a specialty characteristic value SCV corresponding to at least one specialty characteristic of the client is obtained from the specialty calculation unit. It is understood that the specialty characteristic value of the client is generated according to historical articles published by the client. Finally, in step S6400, at least one of a plurality of advertisements is selected as a candidate advertisement according to the article characteristic value, a specialty characteristic value, advertisement characteristic values of respective advertisements, and an advertisement selection record. It is noted that the advertisement selection record can be obtained by analyzing the selection records in the advertisement server. The advertisement selection record comprises the selected historical advertisements corresponding to the client, the article characteristic value of the internet article integrated with the respective selected historical advertisements, and the selection times for the respective selected historical advertisements. Additionally, the candidate advertisements are transmitted to the content editor. The client can select at least one of the candidate advertisements to integrate with the internet article, and publish the internet article to the web site or blog. It is understood that when at least one of the candidate advertisements is selected, an advertisement characteristic record and a selection record are generated. In some embodiments, the selection record can be transmitted from the client to the advertisement server for update.

Figure 7:
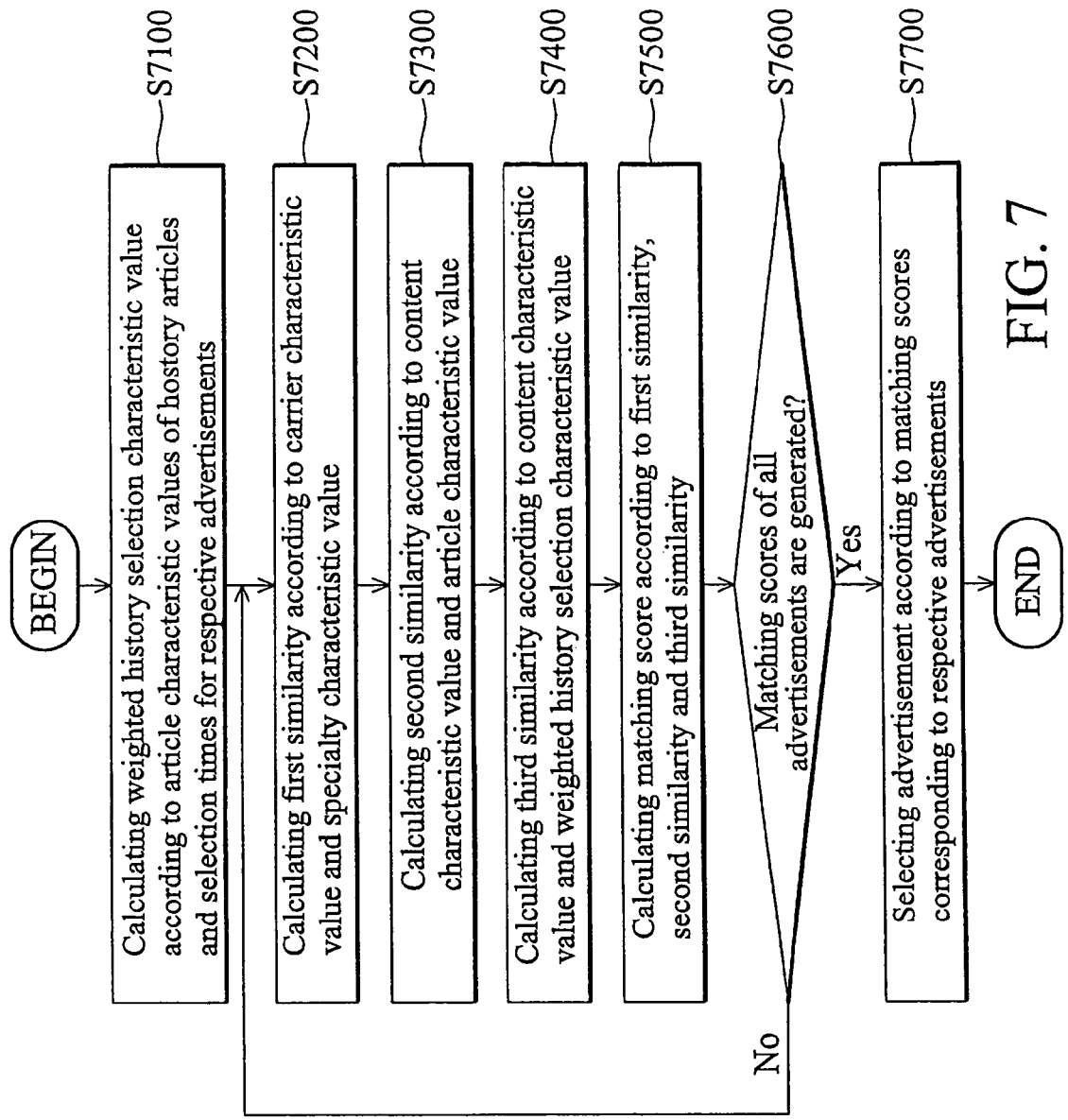
FIG. 7 is a flowchart of an embodiment of an advertisement selection method according to an article characteristic value, a specialty characteristic value, advertisement characteristic values, and advertisement selection records according to the invention.

FIG. 7 is a flowchart of an embodiment of an advertisement selection method according to an article characteristic value, a specialty characteristic value, advertisement characteristic values, and advertisement selection records according to the invention.

In step S7100, a weighted historical selection characteristic value WHSCV is calculated according to the article characteristic value of the internet article integrated with the respective selected historical advertisements and the selection times for the respective selected historical advertisements. Then, for each advertisement, in step S7200, a first similarity FS is calculated according to a carrier characteristic value LCV corresponding to at least one carrier characteristic of the advertisement and the specialty characteristic value SCV of the client. In step S7300, a second similarity SS is calculated according to a content characteristic value CCV corresponding to at least one content characteristic of the advertisement and an article characteristic value ACV of the internet article. In step S7400, a third similarity TS is calculated according to the content characteristic value CCV corresponding to at least one content characteristic of the advertisement and the weighted historical selection characteristic value WHSCV. In step S7500, a matching score MS is calculated according to the first similarity FS, the second similarity SS, and the third similarity TS. In some embodiments, the matching score MS can be calculated according to the following equation: $MS=FS\times W1+SS\times W2+TS'W3$, wherein W1 is the weighting corresponding to the first similarity FS, W2 is the weighting corresponding to the second similarity SS, and W3 is the weighting corresponding to the third similarity TS. W1, W2, and W3 can be adjusted according to different requirements. In step S7600, it is determined whether the matching scores for respective advertisements are generated. If not (No in step S7600), steps S7200~S7500 are repeated, the matching score for another advertisement is calculated. If so (Yes in step S7600), in step S7700, candidate advertisements are determined according to the matching scores of the respective advertisements. Similarity, in some embodiments, if the matching score of an advertisement is greater than a predefined score, the advertisement is determined as a candidate advertisement. In some embodiments, the advertisements are sorted according to the corresponding matching scores, and a predetermined number of the advertisements having higher matching scores are determined as candidate advertisements. Similarity, the candidate advertisements are transmitted to the content editor. The client can select at least one of the candidate advertisements to integrate with the internet article, and publish the internet article to the web site or blog.

It is understood that, in some embodiments, without the consideration of the specialty characteristic value of the client, advertisements can be selected according to the article characteristic value of the internet article, the advertisement characteristic values of respective advertisements, and/or the advertisement selection record.

Figure 8:
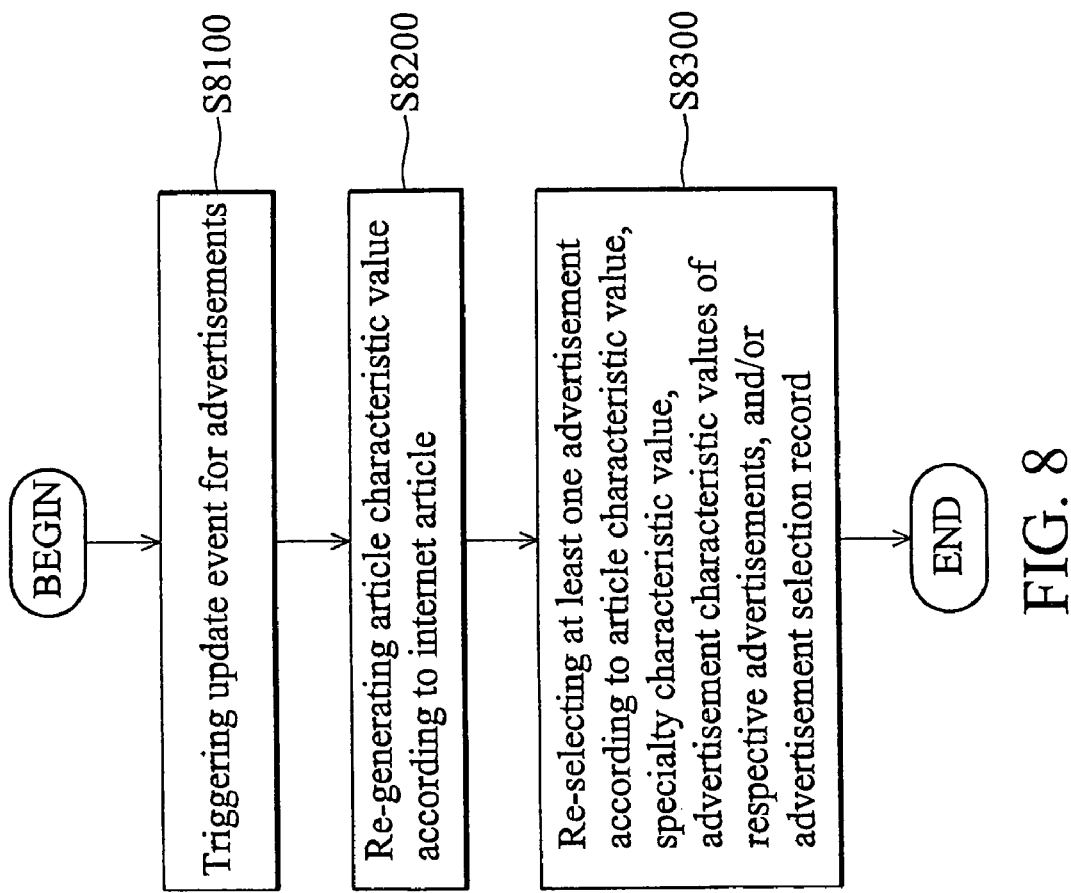
FIG. 8 is a flowchart of an embodiment of an advertisement update method according to the invention.

In some embodiments, the advertisement integrated with the internet article can be updated. FIG. 8 is a flowchart of an embodiment of an advertisement update method according to the invention.

In step S8100, an update event for advertisements is triggered. It is understood that the personal advertisement agent 1120 of the client can check whether any updated events for advertisements have been triggered. The update event for advertisements may comprise the edition of internet articles, the expiration of advertisements, and/or periodical update for advertisements. The expiration of an advertisement can be determined by checking the expiration date/time and selection date/time in the advertisement characteristic record 1121b. In step S8200, an article characteristic value corresponding to at least one article characteristic of an internet article is regenerated according to the content of the internet article. In step S8300, at least one advertisement is selected as a candidate advertisement according to the article characteristic value, the specialty characteristic value of the client, the advertisement characteristic values of the respective advertisements, and/or the advertisement selection record. The candidate advertisement is transmitted to the content editor. The client can select at least one of the candidate advertisement to integrate with the internet article, and publish the internet article to the web site or blog.

In the application, advertisement selection systems and methods for internet articles, select advertisements by simultaneously considering the article content, the advertisement content, the publisher's specialty, and/or advertisement selection record.

Advertisement selection systems and methods for internet articles, or certain aspects or portions thereof, may take the form of a program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An advertisement selection system for internet articles, comprising:
   a client, coupled to the internet, comprising:
      a content editor, editing at least one internet article; and
      a personal advertisement agent, coupled to the content editor, generating an article characteristic value corresponding to at least one article characteristic according to the internet article;
   a specialty degree calculation unit, coupled to the internet, comprising a specialty characteristic value corresponding to at least one specialty characteristic, wherein the specialty characteristic value is generated according to historical articles published by the client; and
   an advertisement server, coupled to the internet, having a plurality of advertisements, each comprising an advertisement characteristic value corresponding to at least one advertisement characteristic, wherein the advertisement server selects one of the advertisements according to the article characteristic value, the specialty characteristic value, and the advertisement characteristic values of the respective advertisements,
   wherein the selected advertisement is integrated and published with the internet article;
   wherein the personal advertisement agent further comprises an advertisement selection record comprising selected historical advertisements corresponding to the client, the article characteristic value of the internet article integrated with the respective selected historical advertisements, and selection times for the respective selected historical advertisements, and the advertisement server selects one of the advertisements according to the article characteristic value, the specialty characteristic value, the advertisement characteristic values of respective advertisements, and the advertisement selection record.

2. The system of claim 1, wherein the advertisement characteristic comprises a carrier characteristic and a content characteristic.

3. The system of claim 2, wherein, for each advertisement, the advertisement server further calculates a first similarity according to the advertisement characteristic value corresponding to the carrier characteristic and the specialty characteristic value, calculates a second similarity according to the advertisement characteristic value corresponding to the content characteristic and the article characteristic value of the internet article, and calculates a matching score according to the first similarity and the second similarity, and the advertisement server determines the selected advertisement according to the matching scores corresponding to the respective advertisements.

4. The system of claim 3, wherein the advertisement server performs a weighting calculation on the first similarity and the second similarity to obtain the matching score.

5. The system of claim 1, wherein the advertisement server further calculates a weighted historical selection characteristic value according to the article characteristic value of the internet article integrated with the respective selected historical advertisements and the selection times for the respective selected historical advertisements, calculates a third similarity for each advertisement according to the advertisement characteristic value corresponding to the content characteristic and the weighted historical selection characteristic value, calculates a matching score according to the first similarity, the second similarity and the third similarity, and determines the selected advertisement according to the matching scores corresponding to the respective advertisements.

6. The system of claim 5, wherein the advertisement server performs a weighting calculation on the first similarity, the second similarity and the third similarity to obtain the matching score.

7. The system of claim 1, wherein the client further comprises an advertisement fetcher obtaining the selected advertisement from the advertisement server via a network.

8. The system of claim 7, wherein when the internet article is edited, the personal advertisement agent re-generates a new article characteristic value corresponding to the article characteristic according to the edited internet article, and transmits the new article characteristic value to the advertisement server via the advertisement fetcher, and then the advertisement server re-selects at least one of the advertisements according to the new article characteristic value, the specialty characteristic value, and the advertisement characteristic values of the respective advertisements, and the advertisement fetcher obtains the re-selected advertisement from the advertisement server.

9. The system of claim 7, wherein the selected advertisement comprises an expiration date/time, and the personal advertisement agent further checks whether the selected advertisement has expired according to the expiration date/time, and if the selected advertisement has expired, the personal advertisement agent transmits the article characteristic value to the advertisement server via the advertisement fetcher, the advertisement server re-selects at least one of the advertisements according to the article characteristic value, the specialty characteristic value, and the advertisement characteristic values of the respective advertisements, and the advertisement fetcher obtains the re-selected advertisement from the advertisement server.

10. The system of claim 7, wherein the personal advertisement agent further periodically transmits the article characteristic value to the advertisement server via the advertisement fetcher, the advertisement server re-selects at least one of the advertisements according to the article characteristic value, the specialty characteristic value, and the advertisement characteristic values of the respective advertisements, and the advertisement fetcher obtains the re-selected advertisement from the advertisement server.

11. An advertisement selection method for internet articles, comprising:
    editing at least one internet article by a client;
    generating an article characteristic value corresponding to at least one article characteristic according to the internet article by the client;
    providing a specialty characteristic value corresponding to at least one specialty characteristic by a specialty degree calculation unit, wherein the specialty characteristic value is generated according to historical articles published by the client;
    providing a plurality of advertisements by a advertisement server, each comprising an advertisement characteristic value corresponding to at least one advertisement characteristic; and
    selecting one of the advertisements according to the article characteristic value by a advertisement server, the specialty characteristic value, and the advertisement characteristic values of the respective advertisements, wherein the selected advertisement is integrated and published with the internet article,
    selecting one of the advertisements according to the article characteristic value, the specialty characteristic value, the advertisement characteristic values of respective advertisements, and an advertisement selection record, wherein the advertisement selection record comprises selected historical advertisements corresponding to the client, the article characteristic value of the internet article integrated with the respective selected historical advertisements, and selection times for the respective selected historical advertisements.

12. The method of claim 11, wherein the advertisement characteristic comprises a carrier characteristic and a content characteristic.

13. The method of claim 12 further comprising:
    calculating a first similarity for each advertisement, according to the advertisement characteristic value corresponding to the carrier characteristic and the specialty characteristic value, calculating a second similarity according to the advertisement characteristic value corresponding to the content characteristic and the article characteristic value of the internet article, and calculating a matching score according to the first similarity and the second similarity; and
    determining the selected advertisement according to the matching scores corresponding to the respective advertisements.

14. The method of claim 13 further comprising performing a weighting calculation on the first similarity and the second similarity to obtain the matching score.

15. The method of claim 11 further comprising:
    calculating a weighted historical selection characteristic value according to the article characteristic value of the internet article integrated with the respective selected historical advertisements and the selection times for the respective selected historical advertisements;
    calculating a third similarity for each advertisement according to the advertisement characteristic value corresponding to the content characteristic and the weighted historical selection characteristic value, and calculate a matching score according to the first similarity, the second similarity and the third similarity; and determining the selected advertisement according to the matching scores corresponding to the respective advertisements.

16. The method of claim 15 further comprising performing a weighting calculation on the first similarity, the second similarity and the third similarity to obtain the matching score.

17. The method of claim 11, wherein when the internet article is edited, the method further comprises:

re-generating a new article characteristic value corresponding to the article characteristic according to the internet article; and re-selecting at least one of the advertisements according to the new article characteristic value, the specialty characteristic value, and the advertisement characteristic values of the respective advertisements, wherein the re-selected advertisement is integrated and published with the internet article.

18. The method of claim 11, wherein the selected advertisement comprises an expiration date/time, and the method further comprise:

checking whether the selected advertisement has expired according to the expiration date/time; and re-selecting at least one of the advertisements if the selected advertisement has expired according to the article characteristic value, the specialty characteristic value, and the advertisement characteristic values of the respective advertisements, wherein the re-selected advertisement is integrated and published with the internet article.

19. The method of claim 11 further comprising periodically re-selecting at least one of the advertisements according to the article characteristic value, the specialty characteristic value, and the advertisement characteristic values of the respective advertisements, wherein the re-selected advertisement is integrated and published with the internet article.

* * * * *